United States Patent [19]
Huber et al.

[11] Patent Number: 5,429,424
[45] Date of Patent: Jul. 4, 1995

[54] PNEUMATIC BRAKE FOR RAILWAY LOCOMOTIVES AND MOTOR CARS

[75] Inventors: Erich Huber, deceased, late of Munich; Robert Hofstetter, heir, Giesenhausen; Gortiz Bernd, Munich, all of Germany

[73] Assignee: Knorr-Bremse AG, Munich, Germany

[21] Appl. No.: 354,062

[22] Filed: Dec. 6, 1994

Related U.S. Application Data

[63] Continuation of Ser. No. 199,698, Feb. 22, 1994, abandoned.

[30] Foreign Application Priority Data

Feb. 24, 1993 [DE] Germany .................. 43 05 679.2

[51] Int. Cl.⁶ .................. B60T 13/26; B60T 15/00
[52] U.S. Cl. .................. 303/2; 188/106 P; 188/156; 303/3; 303/14; 303/15; 303/84.1
[58] Field of Search .................. 303/3, 15, 14, 16, 2, 303/40, 28, 30, 68, 69, 84.1, 84.2, 9, 20, 9.61; 188/156, 157, 106 P, 106 R, 106 F, 159

[56] References Cited

U.S. PATENT DOCUMENTS

| | | | |
|---|---|---|---|
| 2,038,174 | 4/1936 | Hewitt | 303/20 X |
| 2,118,412 | 5/1938 | McCune | 188/159 |
| 2,656,222 | 10/1953 | Hines | 188/159 |
| 2,933,350 | 4/1960 | Hines | 188/156 X |
| 3,443,842 | 5/1969 | Pier | 303/100 X |
| 3,488,570 | 1/1970 | Vint, Jr. et al. | 188/159 X |
| 3,778,115 | 12/1973 | Ryburn et al. | 303/3 |
| 3,823,984 | 7/1974 | Parfitt et al. | |
| 3,845,991 | 11/1974 | Engle | 303/3 |
| 3,924,902 | 12/1975 | Engle | 303/22.5 X |
| 4,002,373 | 1/1977 | Mori | 303/52 X |
| 4,199,195 | 4/1980 | Pekarcik et al. | |
| 4,659,169 | 4/1987 | Rumsey et al. | 303/3 |
| 4,671,576 | 6/1987 | Fourie | 188/156 X |
| 4,744,607 | 5/1988 | Nagata | |
| 5,312,167 | 5/1994 | Giorgetti et al. | 303/3 |

Primary Examiner—Douglas C. Butler
Attorney, Agent, or Firm—Barnes & Thornburg

[57] ABSTRACT

A pneumatic brake system for use with an additional brake including a by-pass valve in parallel to a shut-off valve. The by-pass valve is opened only during an actuating or controlling of the pneumatic brake which exceeds a control range and opens up the passage through the brake pressure line irrespective of the switching condition of the shut-off valve. The connection of the brake cylinder line section of the brake pressure line with the atmosphere by the shut-off valve is at least choked when the by-pass valve is opened up.

17 Claims, 2 Drawing Sheets

PNEUMATIC BRAKE FOR RAILWAY LOCOMOTIVES AND MOTOR CARS

This is a Continuation of application Ser. No. 08/199,698, filed Feb. 22, 1994, now abandoned.

BACKGROUND AND SUMMARY OF THE INVENTION

This invention relates to a pneumatic brake for railway locomotives and motor cars which are equipped with an additional brake, preferably electric brake.

Existing systems include a shut-off valve arranged in a brake pressure line between a brake control valve, which is controlled by the pressure in a main air pipe, and at least one brake cylinder. The shut-off valve in a first switching position, which corresponds to an inoperative additional brake, connects the brake control valve to the brake cylinder and in a second switching position, which corresponds to an operative additional brake, disconnects the brake control valve from the brake cylinder and connects the brake cylinder with the atmosphere.

Generally, the additional electric brake is an electric generator brake, but it may also be an eddy current brake or a hydraulic brake. This additional brake generally operates without wear and/or it permits energy recuperation. Because of this favorable behavior, the additional brake is operated when the locomotive or motor car is braked. It is only when the effect of this additional brake is no longer sufficient that the pneumatic brake is actuated in addition or alone. The braking effect of the additional brake may no longer be sufficient, for example, in the case of very high braking requirements, at very slow driving speeds or when the additional brake fails. When braking is required, the brake control valve of the pneumatic brake as well as the additional brake are actuated. When the additional brake is operative, the shut-off valve keeps the brake cylinder line bled and, despite the response of the brake control valve, excludes a braking by the pneumatic brake. The pneumatic brake is therefore kept back. However, there is the danger that, when the control of the shut-off valve is faulty or when it malfunctions, for example, by mechanical jamming, the passage through the brake pressure line cannot be restored when the additional brake is inoperative. Thus, a braking effect can no longer be achieved by the pneumatic brake. The danger therefore exists that the brake of the locomotive or motor car may fail completely.

Thus, it is an object of the invention to develop a pneumatic brake of the above type such that the above-mentioned danger of a failing of the pneumatic brake with respect to its braking effect is avoided when the additional brake is inoperative.

According to the invention, this object is achieved in that a by-pass valve is provided which is parallel to the shut-off valve. The by-pass valve is opened only during an actuating or controlling of the pneumatic brake which exceeds a control range and opens up the passage through the brake pressure line irrespective of the switching condition of the shut-off valve. The connection of the brake cylinder line section of the brake pressure line with the atmosphere by the shut-off valve is at least choked when the by-pass valve is opened up.

The by-pass valve ensured that, when a rapid braking is initiated by the main air pipe which exceeds the control range of the pneumatic brake, even when the shut-off valve malfunctions, a passage to the brake pressure line is always opened up, and the brake control valve can therefore control a brake pressure into the brake cylinder. The throttling or the blocking of the atmosphere connection of the brake cylinder line section ensures that, at least until the locomotive or motor car stops, a sufficiently high pressure admission to the brake cylinder is maintained.

Other objects, advantages and novel features of the present invention will become apparent from the following detailed description of the invention when considered in conjunction with the accompanying drawings.

DESCRIPTION OF THE PREFERRED EMBODIMENTS

Figure 1:
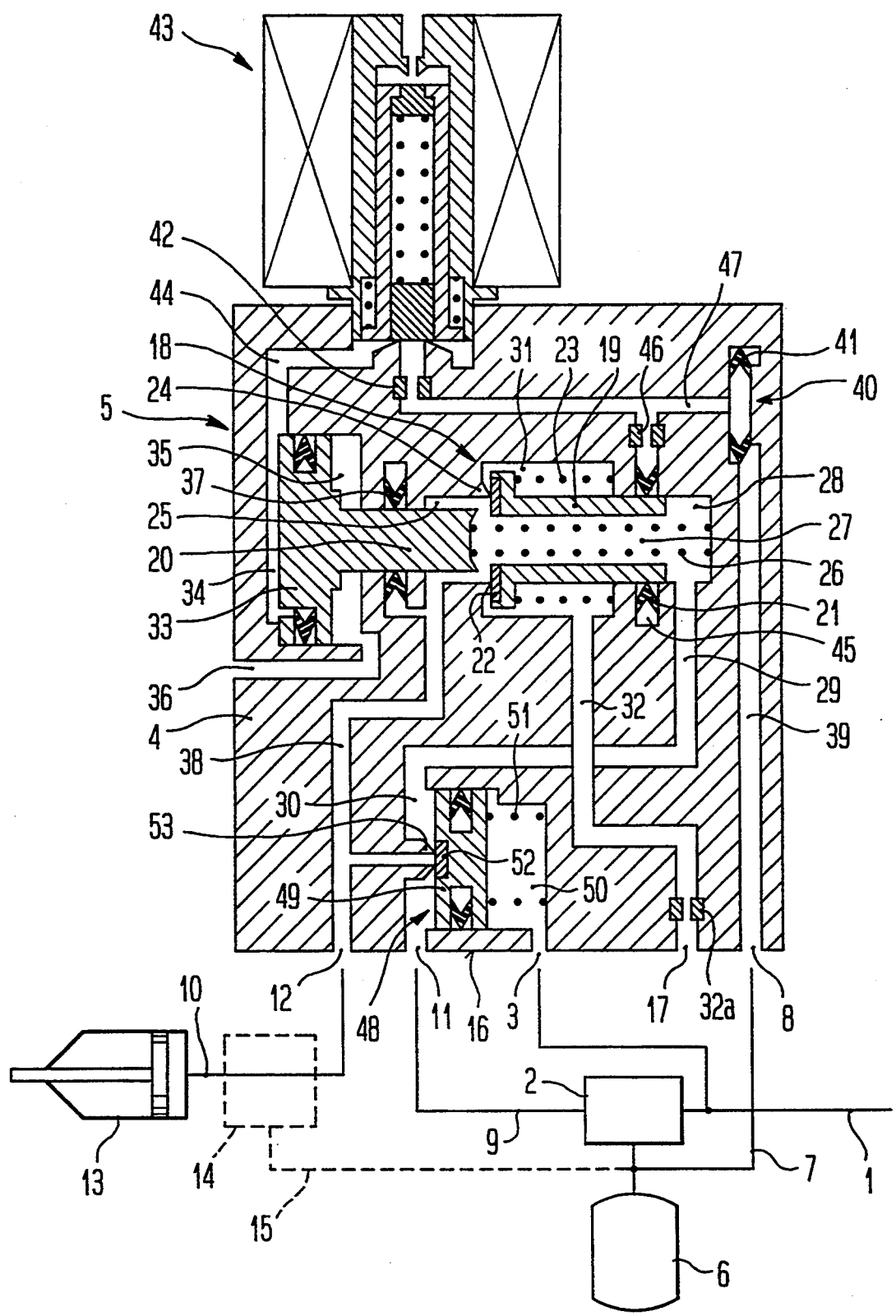
FIGS. 1 and 2 are schematic representations of two embodiments of pneumatic brakes constructed according to the invention.

According to FIG. 1, a main air pipe 1 leads to a brake control valve 2 and to a air pipe port 3 in the housing 4 of a shut-off valve 5. The brake control valve is connected with an air storage tank or reservoir 6 which can be charged with compressed air by a conventional filling device integrated into the brake control valve 2 from the main air pipe 1 or from another compressed air source which is not shown. A pipe 7 connects the air storage tank 6 to reservoir port 8 in the housing 4. The brake control valve 2 is connected to a brake cylinder 13 by brake pressure line 9, 10 and shut-off valve 5. A brake control valve line section 9 of brake pressure line 9, 10 connects a brake pressure outlet of the brake control valve 2 with control valve port 11 of the housing 4. The brake control valve 2 provides the brake pressure from reservoir 6 in response to the pressure on main air pipe 1, as is well known. A brake cylinder line section 10 of the brake pressure line 9, 10, connects brake cylinder port 12 of the housing 4 to at least one brake cylinder 13. A relay valve 14, which is shown by a dash-dotted line, may be arranged in the brake cylinder line section 10 of the brake pressure line 9, 10. The relay valve 14 can be supplied with compressed air from the storage tank 6 by a pipe 15.

The housing 4 has a flange surface 16 by which it can be flanged, in a manner which is not shown, to a valve support which is not shown and which, in a known and conventional manner, provides a connection from the pipes 1, 7, 9 and 10 to the ports 3, 8, 11 and 12 situated in the flange surface 16. Another port 17 in the flange surface 16 of the housing 4 leads to the atmosphere by way of a bleeder valve or a bleeder filter which is not shown.

The shut-off valve 5 includes a valve 18 in the housing 4 which includes, as its movable parts, a valve tube 19 and a tappet 20. The valve tube 19 is slidably disposed in the housing 4 while being sealed off by a radial lip sealing or K ring 21 held in receiving space 45 of the housing 4. A valve sealing ring 22 on the tappet or first side of the valve tube 19, is biased against a valve seat 24 fixed to the housing by a spring 23 loading the valve tube 19. An end of tappet 20 penetrates a space 25 enclosed by the valve seat 24 and, terminates in a valve seat 20a. A spring 26 biases or loads the valve seat 20a away from the valve sealing ring 22 to connect the interior space 27 of the valve tube 19 with the space 25. The other end of interior space 27 and the second end of valve tube 19 ends in a space 28 which is connected by duct 29 with another space 30 in the housing 4 which is connected to atmosphere port 11. The first end of the valve tube 19 which carries the valve sealing ring 22 is situated in space 31 in which the spring 23 is disposed and which is constantly connected with the atmosphere by duct 32 to the atmosphere port 17. A choke 32a is arranged in the duct 32. As a modification, it is also possible to dimension the duct 32 itself as a choke so that the separate choke 32a will not be necessary.

The tappet 20 is slidably disposed in the housing 4 and is connected with a piston 33 on its end facing away from the valve tube 19. A control pressure in a space 34 on one side of piston 33 moves the piston 33 in the contact pressure direction onto the valve sealing ring 22. A space 35 on the other side of piston 33 is constantly connected with the atmosphere by a bleeding duct 36. Alternatively, the atmosphere connection of space 35 may also be via the duct 32. The tappet 20 is sealed by a second lip sealing or K ring 37 which is disposed in the housing 4 and whose radial exterior side is loaded by the pressure in space 25. Space 25 is connected with the brake cylinder port 12 by a duct 38.

An air supply duct 39 leads from the reservoir port 8 by way of a check valve 40, which opens up in this flow direction and which is formed by a third radial lip sealing or K ring 41 held in the housing 4, through a choke 42 to a solenoid valve 43. The solenoid valve 43 is constructed in the manner of a cartridge and is joined to the housing 4 preferably by a screwed connection. The solenoid 43 which, in a known manner, is constructed as a 3/2-way valve and switches the connection of a duct 44 leading to the piston control space 34 to the air supply duct 39 or, while blocking the air supply duct 39, to the atmosphere. The receiving space 45 for the valve tube's lip sealing ring 21 is connected radially on the outside by a choke 46 to the section 47 of the air supply duct 39 which is situated between the check valve 40 and the solenoid valve 43.

A by-pass valve 48 in the housing 4 has an axis direction which is parallel to the valve 18 but is offset laterally. The by-pass valve 48 has a piston 49 which separates space 30 from another space 50 connected with air pipe port 3, and acted upon by the pressure in the main air pipe 1. A spring 51 in space 50 biases or loads the piston 49 and a valve seal 52 thereon against a valve seat 53 which projects into space 30 and whose interior is connected with the duct 38 connected to brake cylinder port 12. As a modification of the illustrated embodiment, the piston 49 with the valve seal 52 may also be constructed as a diaphragm-type piston.

When the additional brake is inoperative and the pneumatic brake is released or is operated maximally within its control range, the shut-off valve 5 takes up the switching position illustrated in the drawings. In this case, the solenoid valve 43 blocks off the air supply duct 39 from the duct 44 and bleeds the duct 44, together with piston control space 34, into the atmosphere. Under the force of the spring 26, the tappet 20 is in its left end position in which it is separated from the valve sealing ring 22. The valve sealing ring 22 rests on the valve seat 24 under the force of the spring 23. As a result, the valve 18 connects control valve port 11 and brake cylinder port 12 with one another by way of the two spaces 28 and 25 via passage 27 in valve tube 19. The passage through the brake pressure line 9, 10 is therefore opened up. Under the force of the spring 51 and the main air pipe pressure from air pipe port 3, the valve seal 52 on the piston 49 rests tightly on the valve seat 53 closing the by-pass valve 48.

It should be observed in this case that in the control range of the pneumatic brake, the pressure in the main air pipe 1 never falls below the brake pressure controlled by the brake control valve 2 in line section 9 and thus existing in space 30 on the other side of piston 49. Normally, when the pneumatic brake 5 is released, the pressure in the main air pipe 1 amounts to 5 bar. Until the maximal braking power is reached in the control range, the pressure in the main air pipe 1 is lowered to approximately 3.6 bar, hereafter called the limit value. The maximal brake pressure amounts to between 2.8 and 3.6 bar. The piston 49 is therefore held by the spring 51, in the control range of the pneumatic brake at any rate, in its shown position which closes off the valve seat 53. The pneumatic brake is therefore fully operable.

When the additional brake is actuated, the solenoid valve 43 switches, blocking off the duct 44 from the atmosphere and connecting duct 44 and piston control space 34 with the air supply duct 39. The piston 33 is therefore acted upon by compressed air in space 34 from reservoir port 8 and is displaced toward the right. The right-side or valve-seat-20a of the tappet 20 seats on the valve sealing ring 22 sealing the passage 27 of the valve tube 19. Continued right word travel the valve tube 19, lifts the valve sealing ring 22 off the valve seat 24 in the process. In this switching position, the valve 18 blocks off the two ducts 29 and 38 from one another, thereby interrupting the passage through the brake pressure line 9, 10, and connects the duct 38 to the space 31 and, through the connecting duct 32, to the atmosphere.

In this switching position, irrespective of a brake pressure feed by the brake control valve 2 into line section 9, line section 10 of the brake pressure line 9, 10 and thus brake cylinder 13 is bled or continues to be bled to atmosphere via atmosphere port 17. Irrespective of an actuating of the brake control valve 2 within its control range, that is, of a pressure decrease in the main air pipe 1 to a value which does not fall below the above-mentioned limit value, the pneumatic brake can therefore not generate any braking effect. A superimposing of the braking effects of the additional brake and of the pneumatic brake is therefore impossible. There can be no overbraking of the locomotive or motor car.

When the additional brake is released and the shut-off valve 5 is fully operable, the solenoid valve 43 switches back, and the valve 18 switches back into the switching position illustrated in the drawings which opens up the passage through the brake pressure line 9, 10. However, if disturbances should occur in this case; for example, if the switching-back of the solenoid valve 43 should not take place because of a control error or other functional error or the switching-back of the valve 18 should not take place because of a jamming of one of its movable parts, the valve 18 keeps the passage through the brake pressure line 9, 10 interrupted and the line section 10 with the brake cylinder 13 is bled, although the additional brake is not actuated. The pneumatic brake is therefore inoperable within its control range.

When such a disturbance or malfunction occurs, a conventional rapid braking must be introduced into the pneumatic brake, the pressure in the main air pipe 1 is bled to a pressure value below the control range, and therefore below the above-mentioned limit value, preferably to atmospheric pressure. As a result, a corresponding pressure reduction also takes place in space 50 of the by-pass valve 48, while the brake control valve 2 controls a maximal brake pressure into line section 9 and space 30 of the by-pass valve 48. This maximal brake pressure acts upon and displaces the piston 49 toward the right against the force of the spring 51 and lifting its valve seal 52 off the valve seat 53. As a result, the two line sections 9 and 10 of the brake pressure line 9, 10 are connected with one another; the passage through the brake pressure line 9, 10 is opened up by the by-pass valve 48; and the brake cylinder 13 is acted upon by compressed air. In this case, the choke 32a delays a compressed-air blow down to the atmosphere of the brake cylinder 13 through the still opened connection of the ducts 38 and 32, in such a manner that the admission of compressed air to the brake cylinder 13 from the air storage tank 6 will continue at least until the locomotive or motor car stops. The locomotive or motor car is therefore braked by the pneumatic brake so that there is no danger of an accident because of brake failure.

If, during the subsequent release of the pneumatic brake, the pressure in the main air pipe 1 is increased above the mentioned limit value into the control range for the pneumatic brake, the by-pass valve 48 switches back, into the illustrated closed switching position, thereby interrupting the passage through the brake pressure line 9, 10.

The above-described switching or opening of the by-pass valve 48 takes place during each rapid-braking control for the pneumatic brake, irrespective of an effectiveness of the additional brake, and is thereby kept running and operable. If an overbraking of the locomotive or motor car is to be avoided, it is expedient to switch off the additional brake as customary in the case of rapid braking and while the pneumatic brake is operative at any rate.

The check valve 40 ensures the compressed-air supply, which is required for the switching of the valve 18, is supplied to the solenoid 43, when the pipe 7 is interrupted and the compressed-air supply to the reservoir port 8 is therefore absent. The brake pressure being fed into line section 9 by the brake control valve 2 and thereby to space 28, can travel past the sealing lips of the lip sealing ring 21 to the receiving space 45 and farther through the chokes 46 and 42 to the solenoid valve 43. The flow-off of this compressed air to the reservoir port 8 through return valve 40 is made impossible. This compressed-air supply to the solenoid valve 43 allows the valve 18 to be also switched in the case of a disturbance of the compressed air supply to the connection reservoir port 8.

If the blow down of compressed air is to be avoided during rapid braking while the valve 18 is disturbed, as described above, the by-pass valve 48 according to FIG. 1 must be redesigned. In this case, it is an additional advantage that the choke 32a or the development of the duct 32 as a choke will not be necessary. Thus, a rapid bleeding of the brake cylinder 13 becomes possible in the case of the switching of the operable valve 18 when the pneumatic brake is already actuated in the control range and when the additional brake becomes operative.

Figure 2:
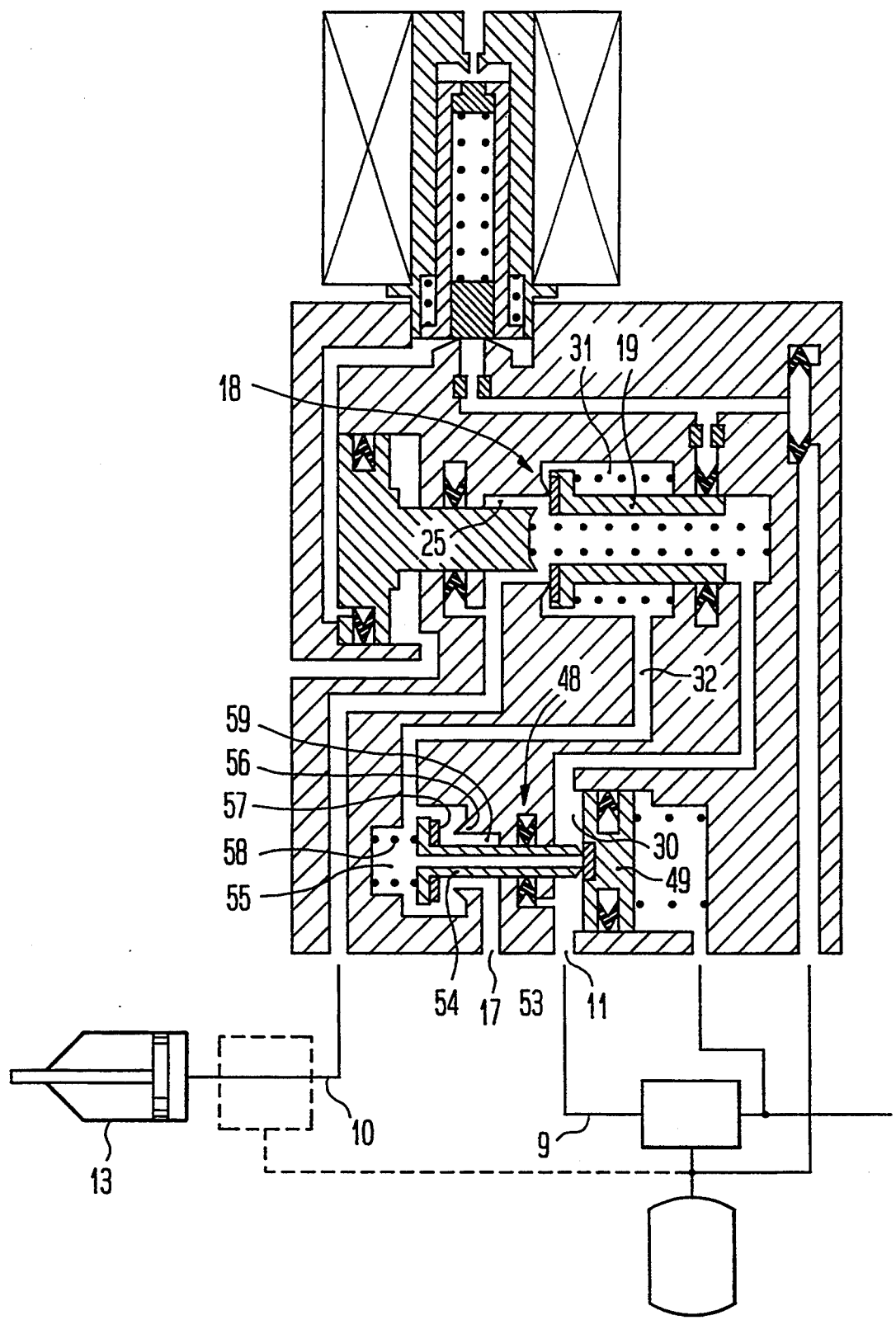

According to FIG. 2, the valve seat 53 of the by-pass valve 48 is situated on a first end of valve tube 54 which is slidably in a sealed manner disposed in the housing 4. A valve sealing ring 57 on the other or second end of valve tube 54 in space 55 faces a valve seat 56 which is fixed to the housing 4 and is penetrated by the valve tube 54. A spring 58 is situated in space 55 and loads the valve tube 54 in the contact pressure direction of the valve sealing ring 57 on the valve seat 56. The space 55 is connected to the duct 32 which is separated from the atmosphere port 17 by valve seat 56. The annulus 59 between the valve seat 56 and the valve tube 54 is connected with the atmosphere port 17. Otherwise, the construction of the pneumatic brake corresponds to that according to FIG. 1.

In the normal position of the by-pass valve 48 illustrated in FIG. 2, the piston 49 holds the valve tube 54 in its left end position in which the valve sealing ring 57 is lifted off the valve seat 56 and the duct 32 is therefore connected with the atmosphere port 17 by space 55 and annulus 59. The method of operation of the pneumatic brake in its control range in this case corresponds completely to that described above according to FIG. 1.

When rapid brakings are controlled into the pneumatic brake, the piston 49 moves to the right and lifts off the valve tube 54 which is displaced into its right end position. In this case, the valve sealing ring 57 is placed on the valve seat 56. As a result, the duct 32 is separated from the annulus 59 and from the atmosphere port 17 and is connected by the valve tube 54 with the space 30 and with the control valve port 11. Because of a disturbance, the valve 18, as described above, should be in a switching position which connects spaces 25 and 31, the passage through the brake pressure line 9, 10 is nevertheless opened up by the by-pass valve 48. A bleeding of the brake cylinder 13 through the line section 10, the spaces 25 and 31 and the duct 32 is impossible because the valve sealing ring 57 closes off the valve seat 56, and therefore a blocking of the connection to atmosphere port 17.

As a deviation from the construction according to FIG. 2, it is also possible when the by-pass valve 48 is switched, to not block the connection to atmosphere port 17 completely, but to permit a slight compressed-air bleeding or blow down. This could be a result of a limited leakiness of the valve formed by the valve seat 56 and the valve seal 57 or by a relatively narrow nozzle or choke which bridges this valve. In this case, when the additional brake is inoperative, the blow down noise signifies the malfunctioning of the valve 18, while the loss of compressed air is low.

In a further modification of the embodiments according to FIGS. 1 and 2, it is also possible to construct the bypass valve 48 so that it is not integrated in the housing 4 but as a separate structural member.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A pneumatic brake for railway locomotives and motor cars, equipped with an additional brake, comprising:
   a brake control valve controlled by pressure in a main air pipe to provide a braking pressure at its output;
   a brake pressure line connecting the control valve's output with at least one brake cylinder;
   a shut-off valve dividing said brake pressure line into a brake control valve line section and a brake cylinder line section and having a first switching position, corresponding to an inoperative state of said additional brake, which interconnects said line sections and having a second switching position, corresponding to an operative state of said additional brake, which disconnects said line sections and connects said brake cylinder line section with the atmosphere;

a by-pass valve connected in parallel with said shut-off valve and which opens to interconnect said line sections during control of the pneumatic brake which exceeds a control range irrespective of the switching position of the shut-off valve;

a choke connecting said brake cylinder line section with the atmosphere at least when the by-pass valve is opened.

2. A pneumatic brake according to claim 1, wherein said by-pass valve includes a piston which is acted upon by the pressure in the main air pipe in the valve closing direction.

3. A pneumatic brake according to claim 2, wherein said piston is acted upon in the valve opening direction by pressure in the brake control valve line section.

4. A pneumatic brake according to claim 3, wherein said piston is loaded by a spring in the valve closing direction.

5. A pneumatic brake according to claim 2, wherein said by-pass valve has a fixed valve seat in a duct leading from the brake control valve line section to the brake cylinder line section and a valve seal on the piston.

6. A pneumatic brake according to claim 1, wherein said by-pass valve is arranged to be integrated in a common housing with said shut-off valve.

7. A pneumatic brake according to claim 1, wherein said shut-off valve includes:

a slidable valve tube having a valve sealing ring at a first end which interacts with a fixed first valve seat and being loaded by a first spring in a first valve closing direction; and a slidable tappet coaxial with said valve tube which engages said valve sealing ring, closing the valve tube and opens said first valve seat for said first switching position and which is disengaged from said valve tube for said second switching position.

8. A pneumatic brake according to claim 7, wherein said shut-off valve includes:

a second spring loading said tappet away from said valve tube;

a piston moving said tappet toward said valve tube in response to a control pressure; and a solenoid valve for controlling a supply pressure as said control pressure as a function of the operational state of said additional brake.

9. A pneumatic brake according to claim 8, wherein said shut-off valve and said by-pass valve are in a common housing along spaced parallel axes and said solenoid valve is joined to said housing.

10. A pneumatic brake according to claim 9, wherein said housing includes supply pressure port, an atmosphere port, a main air pipe port, a brake control valve line section port and a brake cylinder line section port.

11. A pneumatic brake according to claim 10, wherein:

a check valve and a choke are in a duct connecting said supply pressure port to said solenoid valve;

said valve tube projects in a sealed-off slidable manner through a radial lip sealing ring in said housing; and a receiving space of said lip sealing ring is connected radially on its outside to a section of said duct which is between said check valve and said solenoid valve.

12. A pneumatic brake according to claim 10, including first and second spaces in said housing and connected with said brake control valve port;

said first space is penetrated by a valve seat of said by-pass valve and is bounded by a piston which includes a valve seal of said by-pass valve; and a second end of said valve tube is in said second space.

13. A pneumatic brake according to claim 12, including:

a third space which is surrounded by said first valve seat and through which the tappet projects, said third space is connected with the interior of said valve seat of said by-pass valve and said brake cylinder line section; and a fourth space which surrounds said first end of said valve tube and is connected with said atmosphere port.

14. A pneumatic brake according to claim 13, including a choke a duct connecting said fourth space and said atmosphere port.

15. A pneumatic brake according to claim 13, including a blow down valve in a duct connecting said fourth space and said atmosphere port and controlled by said piston of said by-pass valve to close only when said piston is predominantly acted upon by the pressure at said brake control valve line section port.

16. A pneumatic brake according to claim 15, wherein:

said valve seat of said by-pass valve is on first end of a second slidable valve tube;

said second valve tube penetrates a fixed valve seat of said blow down valve and has a second end in a fifth space which is connected to said fourth space;

a valve sealing ring of said blown down valve is on said second end of said second valve tube; and a spring loads said second valve tube in a blow down valve closing direction.

17. A pneumatic brake according to claim 8, wherein:

a check valve and a choke are in a duct connecting a source of said supply pressure port to said solenoid valve;

said valve tube projects in a sealed-off slidable manner through a radial lip sealing ring; and a receiving space of said lip sealing ring is connected radially on its outside to a section of said duct which is between said check valve and said solenoid valve.

* * * * *

UNITED STATES PATENT AND TRADEMARK OFFICE
CERTIFICATE OF CORRECTION

PATENT NO. : 5,429,424
DATED : July 4, 1995
INVENTOR(S) : Erich Huber, et. al.

It is certified that error appears in the above-indentified patent and that said Letters Patent is hereby corrected as shown below:

Title page, item [75], inventor, Hofstetter's city should read--
Geisenhausen".--

Signed and Sealed this

Twenty-sixth Day of September, 1995

Attest:

BRUCE LEHMAN

Attesting Officer     Commissioner of Patents and Trademarks